United States Patent
Effenberger et al.

(10) Patent No.: US 9,942,003 B2
(45) Date of Patent: Apr. 10, 2018

(54) ADAPTIVE FORWARD ERROR CORRECTION (FEC) IN PASSIVE OPTICAL NETWORKS (PONS)

(71) Applicant: Futurewei Technologies, Inc., Plano, TX (US)

(72) Inventors: Frank Effenberger, Colts Neck, NJ (US); Yuanqiu Luo, Cranbury, NJ (US); Ding Zou, Tucson, AZ (US); Xiang Liu, Marlboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/255,073

(22) Filed: Sep. 1, 2016

(65) Prior Publication Data

US 2017/0070314 A1    Mar. 9, 2017

Related U.S. Application Data

(60) Provisional application No. 62/214,669, filed on Sep. 4, 2015.

(51) Int. Cl.
*H04B 10/06* (2006.01)
*H04L 1/00* (2006.01)
(Continued)

(52) U.S. Cl.
CPC ........... *H04L 1/0048* (2013.01); *H04B 10/27* (2013.01); *H04B 10/66* (2013.01); *H04J 14/02* (2013.01);
(Continued)

(58) Field of Classification Search
CPC .. H04B 10/27; H04B 10/6165; H04B 10/616; H04B 10/613; H04B 10/6164;
(Continued)

(56) References Cited

U.S. PATENT DOCUMENTS 5,812,603 A * 9/1998 Luthi .................... H04L 1/0045
375/287
7,484,165 B2   1/2009 Griesser et al.
(Continued)

FOREIGN PATENT DOCUMENTS

| CN | 1816969 A   | 8/2006 |
| CN | 101686104 A | 3/2010 |
| CN | 103199937 A | 7/2013 |

OTHER PUBLICATIONS

"Gigabit-Capable Passive Optical Networks (G-PON): Transmission Convergence Layer Specification," Series G: Transmission Systems and Media, Digital Systems and Networks—Digital Sections and Digital Line System—Optical Line Systems for Local and Access Networks, ITU-T Telecommunication Standardization Sector, G.984.3, Jan. 2014, 170 pages.
(Continued)

*Primary Examiner* — Hanh Phan
(74) *Attorney, Agent, or Firm* — Conley Rose, P.C.

(57) ABSTRACT

An apparatus in a network such as an optical passive network (PON) includes a first decoder configured to decode an encoded data signal using a first code to generate a decoded signal. When the encoded data signal comprises unknown information that was not successfully decoded by the first decoder and would otherwise be ignored, the unknown information is included in the decoded signal. The apparatus may further include a second decoder configured to decode the decoded signal using a stronger code than the first code.

17 Claims, 7 Drawing Sheets

(51) Int. Cl.
    *H04B 10/27*  (2013.01)
    *H04B 10/66*  (2013.01)
    *H04J 14/02*  (2006.01)
    *H04J 14/08*  (2006.01)
(52) U.S. Cl.
    CPC ............ *H04J 14/08* (2013.01); *H04L 1/0045* (2013.01); *H04L 1/0064* (2013.01); *H04L 1/0065* (2013.01)
(58) Field of Classification Search
    CPC ............... G06F 11/1625; H03M 13/29; H03M 13/2906; H03M 13/2948; H03M 13/616
    USPC ....... 398/202, 208, 209, 210, 212, 213, 214, 398/135, 136, 77, 78, 183, 188, 192, 193, 398/194, 158, 159, 72, 68, 70, 71; 375/224, 340, 341, 287, 295, 316; 714/755, 762, 786, 788, 756, 752, 784
    See application file for complete search history.

(56) References Cited

U.S. PATENT DOCUMENTS

| | | | |
|---|---|---|---|
| 7,603,591 B2* | 10/2009 | Chiou | H04L 1/0054 714/704 |
| 8,667,377 B1 | 3/2014 | Mazahreh et al. | |
| 2010/0158530 A1* | 6/2010 | Soto | H04B 10/40 398/79 |
| 2012/0141138 A1* | 6/2012 | Yang | H04L 1/0003 398/158 |
| 2012/0233518 A1 | 9/2012 | Lee et al. | |
| 2013/0045015 A1* | 2/2013 | Kuschnerov | H04B 10/61 398/208 |

OTHER PUBLICATIONS

"10-Gigabit-Capable Passive Optical Networks (XG-PON): Transmission Convergence (TC) Layer Specification," Series G: Transmission Systems and Media, Digital Systems and Networks—Digital Sections and Digital Line System—Optical Line Systems for Local and Access Networks, ITU-T Telecommunication Standardization Sector, G.987.3 Jan. 2014, 146 pages.

Partial English Translation and Abstract of Chinese Patent Application No. CN101686104, Mar. 31, 2010, 27 pages.

Partial English Translation and Abstract of Chinese Patent Application No. CN103199937, Jul. 10, 2013, 7 pages.

Foreign Communication From a Counterpart Application, PCT Application No. PCT/CN2016/097947, English Translation of International Search Report dated Nov. 25, 2016, 4 pages.

* cited by examiner

ADAPTIVE FORWARD ERROR CORRECTION (FEC) IN PASSIVE OPTICAL NETWORKS (PONS)

CROSS-REFERENCE TO RELATED APPLICATIONS

This application claims priority to U.S. provisional patent application No. 62/214,669 filed Sep. 4, 2015 by Frank Effenberger, et al., and titled "Adaptive Forward Error Correction (FEC) in Passive Optical Networks (PONs)," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile," which is the final portion of a telecommunications network that delivers communication to customers. A PON is a point-to-multipoint (P2MP) network comprised of an optical line terminal (OLT) at a central office (CO), an optical distribution network (ODN), and optical network units (ONUs) at the user premises. PONs may also comprise remote nodes (RNs) located between the OLTs and the ONUs, for instance at the end of a road where multiple customers reside.

In recent years, time-division multiplexing (TDM) PONs such as gigabit-capable PONs (GPONs) and Ethernet PONs (EPONs) have been deployed worldwide for multimedia applications. In TDM PONs, the total capacity may be shared among multiple users using a time-division multiple access (TDMA) scheme, so the average bandwidth for each user may be limited to below 100 megabits per second (Mb/s).

Wavelength-division multiplexing (WDM) PONs are considered a very promising solution for future broadband access services. WDM PONs can provide high-speed links with dedicated bandwidth up to 10 gigabits per second (Gb/s). By employing a wavelength-division multiple access (WDMA) scheme, each ONU in a WDM PON is served by a dedicated wavelength channel to communicate with the CO or the OLT. Next-generation PONs (NG-PONs) and NG-PON2s may include point-to-point (P2P) WDM PONs (P2P-WDM PONs), which may provide data rates higher than 10 Gb/s. NG-PONs and NG-PON2s may also include time- and wavelength-division multiplexing (TWDM) PONs, which may also provide data rates higher than 10 Gb/s.

SUMMARY

One issue in conventional PONs is that there may be a limited number of link budgets for communications over an optical link. For example, a standard PON may specify two distinct budgets, one where forward error correction (FEC) is applied to data transmissions via the optical link, and another where FEC is not applied. The concepts disclosed herein provide an adaptive FEC scheme that employs a concatenation code comprising a simple inner code and a relatively stronger outer code, where various link budgets may be obtained by using different inner codes in combination with the outer code. Further, the adaptive FEC scheme may be extended to an implementation of concatenation code decoding in which an inner decoder may decode data using the inner code, where any unknown information generated by the inner decoder that would otherwise be ignored may be passed to an outer decoder, which may decode data including the unknown information using the outer code.

In one embodiment, the disclosure includes a network apparatus having a receiver configured to receive an encoded data signal, a first decoder configured to decode the encoded data signal using a first code to generate a decoded signal. When the encoded data signal comprises unknown information that was not successfully decoded by the first decoder and would otherwise be ignored, the decoded signal includes the unknown information. The network apparatus includes a second decoder configured to decode the decoded signal using a second code.

In some embodiments, the network apparatus selects the first code from a plurality of different codes, where each different code is configured to be used in combination with the second code to change a budget of an optical link. In one or more embodiments, the second code includes a Reed-Solomon (RS) code, and the different codes include at least one of the following codes: Repetition code, extended Hamming code, shortened-extended Bose-Chaudhuri-Hocquenghem (BCH) code, or shortened Extended-BCH (SEBCH) code. In one or more embodiments, the first code and the second code are byte- or word-aligned with one another. In one or more embodiments, the network apparatus includes a standard forward error correction (FEC) decoder having an output coupled to an input of the first decoder. In one or more embodiments, the network apparatus includes an optical network unit (ONU) or an optical line terminal (OLT) configured to receive the encoded data signal in a passive optical network (PON). In one or more embodiments, the network apparatus receives the encoded data signal via a transmission channel configured as a binary symmetric channel (BSC) mixed with a binary erasure channel (BEC).

In another embodiment, the disclosure includes a method implemented at a receiver of a network unit. The method includes receiving an encoded data signal, and decoding the encoded data signal using a first code to generate a decoded signal. When the encoded data signal comprises unknown information that was not successfully decoded using the first code and would otherwise be ignored, the decoded signal includes the unknown information. The method further includes decoding the decoded signal using a second code.

In some embodiments, the first code is selected from a plurality of different codes, where each different code is configured to be used in combination with the second code to change a budget of an optical link. In one or more embodiments, the second code includes a Reed-Solomon (RS) code, and the different codes include at least one of the following codes: Repetition code, extended Hamming code, shortened-extended Bose-Chaudhuri-Hocquenghem (BCH) code, or shortened Extended-BCH (SEBCH) code. In one or more embodiments, the first code and the second code are byte- or word-aligned with one another. In one or more embodiments, the network unit includes an optical network unit (ONU) or an optical line terminal (OLT) configured to receive the encoded data signal in a passive optical network (PON). In one or more embodiments, the receiver includes a first decoder configured to decode the encoded data signal, and a standard forward error correction (FEC) decoder having an output coupled to an input of the first decoder. In one or more embodiments, the encoded data signal is received via a transmission channel configured as a binary symmetric channel (BSC) mixed with a binary erasure channel (BEC).

In yet another embodiment, the disclosure includes a non-transitory computer readable medium comprising instructions executable by a processor of a network unit to implement a method. The method includes receiving an encoded data signal, and decoding the encoded data signal using a first code to generate a decoded signal. When the encoded data signal comprises unknown information that was not successfully decoded using the first code and would otherwise be ignored, the decoded signal includes the unknown information. The method further includes decoding the decoded signal using a second code.

In some embodiments, the first code is selected from a plurality of different codes, where each different code is configured to be used in combination with the second code to change a budget of an optical link. In one or more embodiments, the second code includes a Reed-Solomon (RS) code, and the different codes include at least one of the following codes: Repetition code, extended Hamming code, shortened-extended Bose-Chaudhuri-Hocquenghem (BCH) code, or shortened Extended-BCH (SEBCH) code. In one or more embodiments, the first code and the second code are byte- or word-aligned with one another. In one or more embodiments, the processor is configured to implement the method in a passive optical network (PON), where the network unit includes an optical network unit (ONU) or an optical line terminal (OLT). In one or more embodiments, the encoded data signal is received via a transmission channel configured as a binary symmetric channel (BSC) mixed with a binary erasure channel (BEC).

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for using an adaptive forward error correction (FEC) coding scheme in a PON. The PON comprises a transmitter configured to transmit encoded data to a receiver via a transmission channel, wherein a concatenated code is used to encode the data prior to transmission. The concatenated code may comprise an outer code and a relatively simpler inner code selected from a plurality of different inner codes, where each inner code may be used in combination with the outer code to obtain different link budgets. At the receiver, an inner decoder may decode the encoded data using the same inner code used to encode the data. If the encoded data comprises unknown information that cannot be successfully decoded and would otherwise be ignored, the inner decoder may pass the unknown information to be decoded by an outer decoder using a relatively stronger code than the inner code. By passing unknown information from the inner decoder to the outer decoder, coding gains in the PON may improve.

Figure 1:
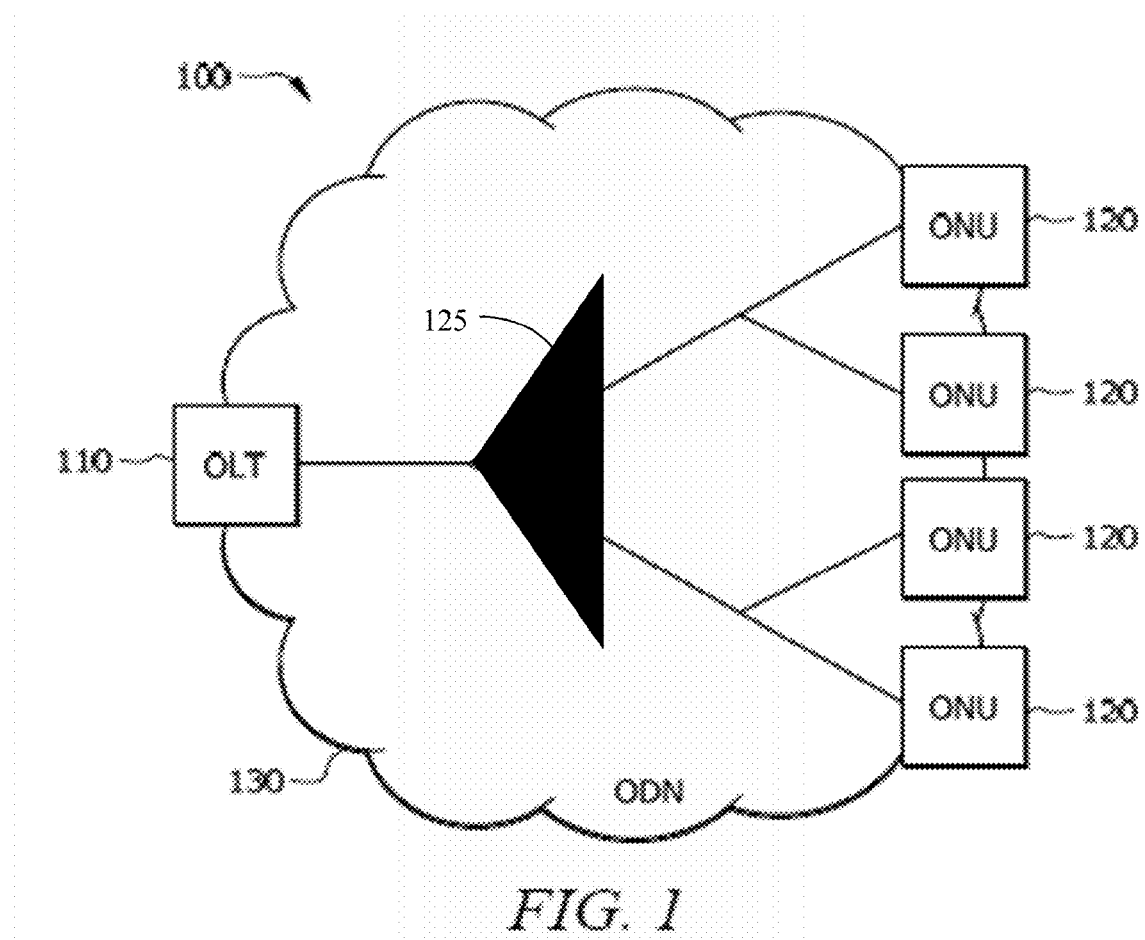
FIG. 1 depicts a schematic diagram of a PON.

FIG. 1 is a schematic diagram of a passive optical network (PON) 100 for implementing embodiments of the present disclosure. The PON 100 may comprise an optical line terminal (OLT) 110, one or more optical network units (ONUs) 120, and an optical distribution network (ODN) 130 configured to couple the OLT 110 to the ONUs 120. While four ONUs are depicted in FIG. 1, the PON 100 may comprise more or less ONUs 120 in other implementations.

The PON 100 may be configured as a communications network that may not require active components to distribute data between the OLT 110 and the ONUs 120. Instead, the PON 100 may use passive optical components in the ODN 130 to distribute data between the OLT 110 and the ONUs 120. The PON 100 may comprise any suitable network such as a next-generation PON (NG-PON), an NG-PON1, an NG-PON2, a gigabit-capable PON (GPON), a 10 gigabit per second PON (XG-PON), an Ethernet PON (EPON), a 10 gigabit per second EPON (10G-EPON), a next-generation EPON (NG-EPON), a wavelength-division multiplexing (WDM) PON, a time- and wavelength-division multiplexing (TWDM) PON, point-to-point (P2P) WDM PONs (P2P-WDM PONs), an asynchronous transfer mode PON (APON), a broadband PON (BPON), etc.

An EPON is a PON standard developed by the Institute of Electrical and Electronics Engineers (IEEE) and specified in IEEE 802.3, which is incorporated herein by reference as if reproduced in its entirety. In EPON, a single fiber can be used for both the upstream and the downstream transmission with different wavelengths. The OLT 110 may implement an EPON Media Access Control (MAC) layer for transmission of Ethernet frames, while a Multi-Point Control Protocol (MPCP) may be implemented to perform bandwidth assignment, bandwidth polling, auto-discovery, ranging, and the like. Ethernet frames may be broadcast downstream based on a Logical Link Identifier (LLID) embedded in a preamble frame. Upstream bandwidth may be assigned based on the exchange of signals (e.g., Gate and Report messages) between the OLT 110 and an ONU 120.

The OLT 110 is configured to communicate with the ONUs 120 and another network (not shown). Specifically, the OLT 110 may act as an intermediary between the other network and the ONUs 120. For instance, the OLT 110 may forward data received from the other network to the ONUs 120, and forward data received from the ONUs 120 to the other network. The OLT 110 may comprise at least one transmitter and receiver. In scenarios where the other network uses a network protocol different from the protocol used in the PON 100, the OLT 110 may comprise a converter for converting the network protocol to the PON protocol, and vice versa. The OLT 110 is typically located at a central location such as a central office (CO), but it may also be located at other suitable locations.

In some implementations, the ODN 130 may be a data distribution system that includes optical fiber cables, couplers, splitters, distributors, and/or other equipment. Such components may include passive optical components that do not require power to distribute data signals between the OLT 110 and the ONUs 120. Alternatively, one or more components within the ODN 130 may take the form of active (e.g., powered) components such as optical amplifiers. The ODN 130 may typically extend from the OLT 110 to the ONUs 120 in a branching configuration as shown, but the ODN 130 may be configured in any other suitable point-to-multipoint (P2MP) configuration.

In an embodiment, the ODN 130 may comprise an optical splitter 125 located between the OLT 110 and ONUs 120. The splitter 125 may be any suitable device for splitting a combination of optical signals and forwarding the split signals to the ONUs 120. The splitter 125 may also be any suitable device for receiving signals from the ONUs 120, combining those signals into a combined received signal, and forwarding the combined received signal to the OLT 110. For example, the splitter 125 may split a downstream optical signal into n split downstream optical signals in the downstream direction (e.g., from the OLT 110 to the ONUs 120), and combine n upstream optical signals into one combined upstream optical signal in the upstream direction (e.g., from the ONUs 120 to the OLT 110), where n is equal to the number of ONUs 120. In some aspects, the OLT 110 may comprise a bi-directional optical amplifier (OA) to amplify a combined transmitted signal as needed in order to forward the combined transmitted signal to the splitter 125, and to receive a combined signal from the splitter 125 and amplify the combined received signal as needed.

The ONUs 120 may communicate with the OLT 110 and a customer or user (not shown), and the ONUs 120 may act as an intermediary between the OLT 110 and the customer. For instance, the ONUs 120 may forward data from the OLT 110 to the customer, and forward data from the customer to the OLT 110. The ONUs 120 may comprise an optical transmitter for transmitting optical signals to the OLT 110 and an optical receiver for receiving optical signals from the OLT 110. The ONUs 120 may further comprise a converter that converts optical signals into electrical signals and converts electrical signals into optical signals. In some aspects, the ONUs 120 may comprise a second transmitter that transmits the electrical signals to the customer and a second receiver that receives electrical signals from the customer. ONUs 120 and optical network terminals (ONTs) are similar, and thus the terms may be used interchangeably herein. The ONUs 120 may typically be located at distributed locations such as customer premises, but they may also be located at other suitable locations.

Generally, there are requirements for operating the PON 100 with distinct links to the ONUs 120. For example, the difference between a power level at which a signal is transmitted over an optical link and a minimum power level required in order for that signal to be received may define the maximum path loss that may occur between the transmitter and receiver. The maximum path loss for a given link may vary according to particular classes of a PON. Table 1 below depicts an example of minimum and maximum path losses specified by International Telecommunication Union (ITU) Telecommunication Standardization Sector (ITU-T) standards for Classes N1, N2, E1, E2 in an XG-PON1 system.

TABLE 1

|  | Class N1 | Class N2 | Class E1 | Class E2 |
| --- | --- | --- | --- | --- |
| Min. Loss | 14 dB | 16 dB | 18 dB | 20 dB |
| Max. Loss | 29 dB | 31 dB | 33 dB | 35 dB |

Table 1 specifies the optical link budgets for each particular class. For example, the optical link budget for Class N2 is satisfied if the maximum path loss over a link (e.g., a standard link) between a transmitter and receiver does not exceed 31 decibel (dB), while the optical link budget for Class E1 is satisfied if the maximum loss over a link (e.g., an enhanced link) between the transmitter and receiver does not exceed 33 dB. Thus, the E1 class provides a 2 dB improvement in terms of power loss budget.

In an embodiment, the PON 100 may employ forward error correction (FEC) codes to improve communication reliability and increase power link budgets. The basic operation of an FEC scheme involves adding redundancy bytes (e.g., parity bits) to data using a code. The redundancy of FEC allows receivers in the PON 100 to detect and correct errors in transmitted data (e.g., introduced via the link, transmitter, receiver, storage medium, or the like), thereby avoiding the need for data retransmissions. The PON 100 may implement any suitable type of FEC scheme such as Reed-Solomon (RS), Bose-Chaudhuri-Hocquenghem (BCH), low-density parity-check (LDPC) coding, binary convolutional code (BCC), or the like.

An RS code is typically denoted in the form of RS(n, k), where "n" represents the size of the code word and "k" represents the block size. An RS(n, k) code can correct up to (n−k)/2 (random) symbol errors, where a symbol usually comprises one 8-bit byte. In a GPON, ITU-T G.984.3, which is incorporated herein by reference, specifies RS(255,239) as the PON FEC code, where the length (size) of the data section of each FEC codeword is 239 bytes and the number of parity bytes of the codeword is 16 bytes. In an asymmetric XG-PON (XG-PON1), ITU-T G.987.3, which is incorporated by reference, specifies RS(248,216) as the FEC code for downstream transmissions, and specifies RS(248,232) as the FEC code for uplink transmissions. In a TWDM PON, ITU-T G.989.3, which is incorporated by reference, specifies RS(248,232) and RS(248,216) as the FEC codes for a 2.5 gigabit (2.5 G) and a 10 G link, respectively.

Depending on the FEC code used, FEC may increase the link budget of the PON 100 by approximately 1-4 decibels (dB) as compared to when FEC is not used. Deciding whether to apply FEC codes may be based on the particular standard and power link budgets specified for the PON 100. A standard XG-PON1 system supports one type of FEC code and two types of link budgets, one where FEC is applied (on) and another where FEC is not applied (off). Yet this setup may not fully satisfy distinct link budget requirements or provide variable link budgets.

In an embodiment, a method of adaptive FEC concatenation coding may be employed to achieve various link budgets in a single optical system such as PON 100. While the following description may focus on an implementation where the PON 100 comprises an XG-PON1, the disclosed embodiments are applicable to other implementations where the PON 100 may comprise any suitable PON.

Figure 2:
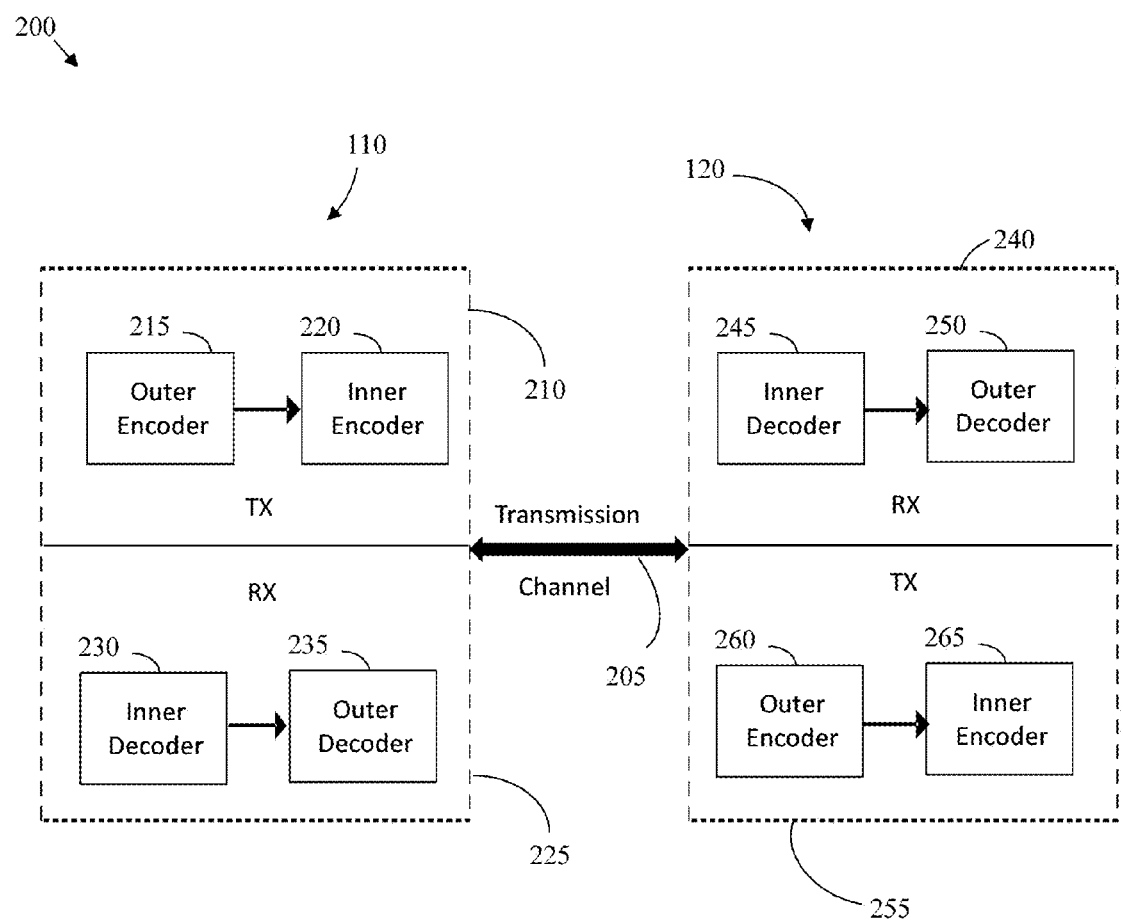
FIG. 2 depicts a schematic diagram of an FEC code concatenation system according to an embodiment of the disclosure.

FIG. 2 is a schematic diagram of an FEC concatenation system 200 according to an embodiment of the disclosure. The system 200 comprises a transmission channel 205 configured to communicatively link the OLT 110 to at least one ONU 120. The OLT 110 may comprise at least one transmitter 210 having one or more encoders such as a first encoder 215 and a second encoder 220, and at least one receiver 225 having one or more decoders such as a first decoder 230 and a second decoder 235. Likewise, the ONU 120 may comprise at least one receiver 240 having one or more decoders such as a first decoder 245 and a second decoder 250, and at least one transmitter 225 having one or more encoders such as a first encoder 260 and a second encoder 265. As used herein, the terms "first encoder" and "second encoder" may refer to an "outer encoder" and an "inner encoder," respectively, while the terms "first decoder" and "second decoder" may refer to an "inner decoder" and an "outer decoder," respectively. In other implementations, the OLT 110 and ONU 120 may have a different number of encoders and/or decoders, where the number of encoders and/or decoders employed by the OLT 110 and ONU 120 may be the same or different.

In some aspects, the transmitter 210 and receiver 225 at the OLT 110 and the transmitter 255 and receiver 240 at the ONU 120 may be combined into single transceiver units. Additionally or alternatively, the outer/inner encoders 215, 220 and inner/outer decoders 230, 235 at the transmitter 210 may be combined as single encoding and decoding units, respectively. Similarly, the inner/outer decoders 245, 250 and outer/inner encoders 260, 265 at the receiver 240 may be combined as single decoding and encoding units, respectively. Further, the OLT 110 and the ONU 120 may each comprise various components such as, but not limited to, a microprocessor, microcontroller, input/output (I/O) circuitry, and memory configured to store instructions/code executable by the OLT 110 and the ONU 120.

In general, data intended for transmission from the OLT 110 to the ONU 120 may be input to the outer encoder 215, which may encode the data and output the encoded data to the inner encoder 220. The inner encoder 220 may perform further encoding to generate an encoded data stream, which the transmitter 210 may output to the receiver 240 of the ONU 120 via the transmission channel 205. In addition, the OLT 110 may inform the ONU 120 of the codes used by the outer and inner encoders 215, 220.

The inner decoder 245 may decode the encoded data stream and output inner decoded data to the outer decoder 250, which may decode the inner decoded data to generate outer decoded data (i.e., corrected data). When the ONU 120 comprises data intended for transmission to the OLT 110, the outer and inner encoders 260, 265 may perform similar operations as the outer and inner encoders 215, 220, respectively, while the inner and outer decoders 230, 235 of the OLT 110 may perform similar operations as the inner and outer decoders 245, 250, respectively.

In an embodiment, the system 200 may employ FEC concatenation codes derived from one or more codes such as a first code and a second code. As used herein, the term "first code" and "second code" may refer to an "inner code" and an "outer code," respectively, where the inner code and outer code employed by the system 200 may comprise codes such as listed in Table 2 below. Briefly, the system 200 may reuse a relatively strong outer code in combination with one of a plurality of simpler inner codes (i.e., higher code rate), where different inner codes may be used to obtain various link budgets. When the system 200 takes the form of a GPON, XG-PON1, TWDM-PON, or the like, a standard FEC code such as a Reed-Solomon (RS) code may be used as the outer code. This may allow for reuse of standard FEC logic used in PONs.

TABLE 2

| Inner Code | Outer Code | Inner Code Rate (dB) | Overall Code Rate (dB) | BER in @1e−15 |
|---|---|---|---|---|
| Repetition (4, 1) | RS (248, 216) | 0.25 | 0.2177 | ~2.4e−2 |
| Repetition (3, 1) |  | 0.33 | 0.2874 | ~1.6e−2 |
| EHamming (8, 4) |  | 0.5 | 0.4355 | ~2.2e−2 |
| SEBCH (13, 8) |  | 0.615 | 0.5356 | ~1.8e−2 |
| SEBCH (61, 48) |  | 0.7869 | 0.6854 | ~9.5e−3 |
| SEBCH (39, 32) |  | 0.8205 | 0.7146 | ~5.7e−3 |

The codes listed above and/or other codes may be stored on one or more storage devices within OLT 110 and/or ONU 120. "Repetition (x,1)" represents a code that repeats every original code x times in transmission. "EHamming (a,b)" represents an extended Hamming code based on code Hamming (a,b). "SEBCH (13,8)" represents a shortened-extended Bose-Chaudhuri-Hocquenghem (BCH) code based on Extended-BCH (16,11). "SEBCH (61,48)" is shortened from Extended-BCH (64,51). "SEBCH (39,32)" is shortened (or truncated) from Extended-BCH (64,57). Using an inner code such as one of the Repetition, Hamming, or BCH codes listed in Table 2 may simplify inner coding operations and minimize complexity to obtain different link budgets. As for the outer code, outer encoders 215, 260 may encode data using RS(248,216) to generate a 248-byte codeword having 32 redundancy bytes, while outer decoders 235, 250 may decode data using RS(248,216). However, one or more different outer codes may be used in other embodiments (e.g., according to a type of PON in which system 200 is implemented). Without limitation, such outer codes may be based on LDPC coding, RS coding, turbo coding, BCH coding, convolutional coding, turbo trellis coded modulation (TTCM) coding, etc.

Figure 3:
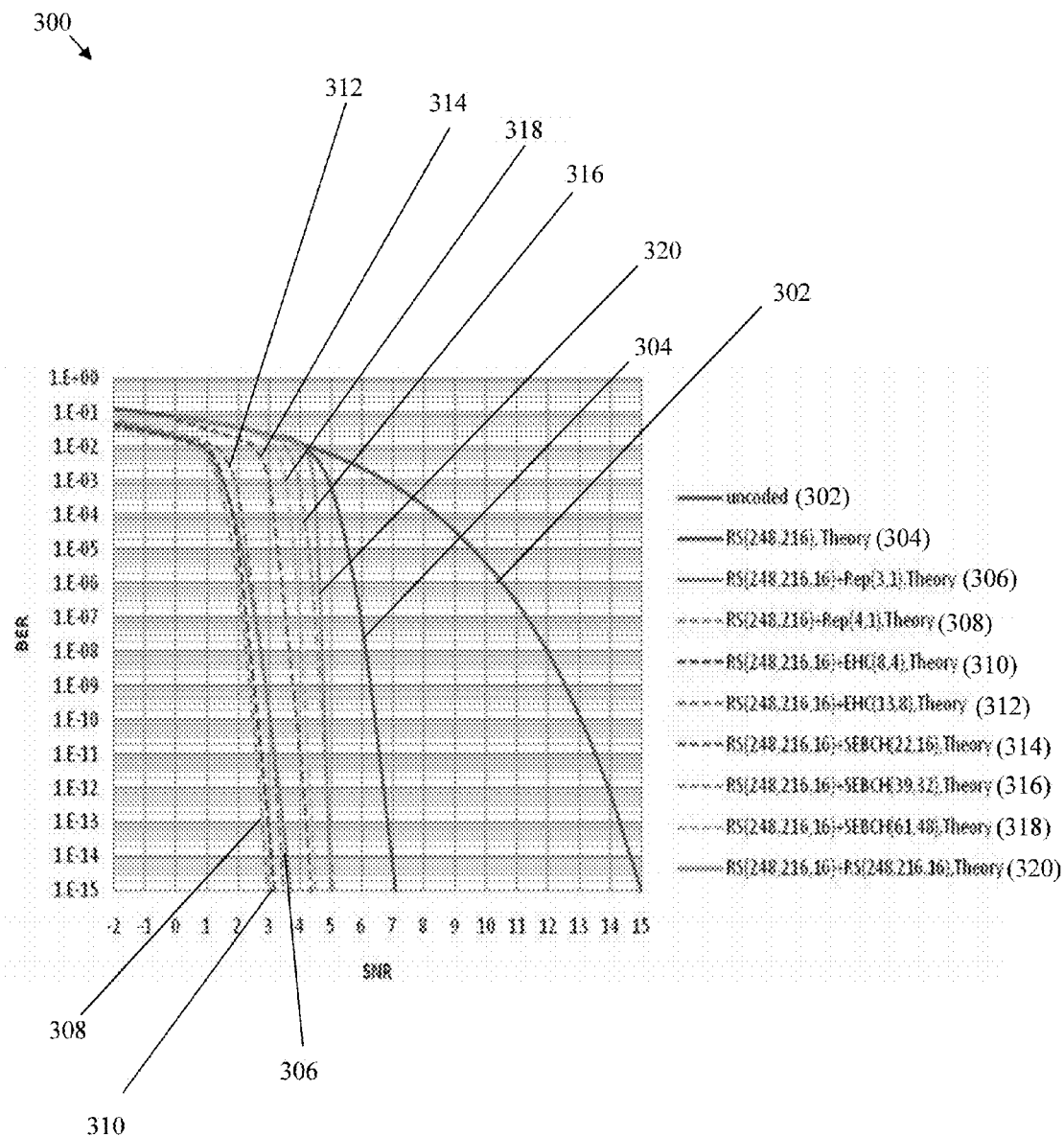
FIG. 3 depicts a graph comparing code performance of different FEC concatenation coding schemes according to embodiments of the disclosure.

FIG. 3 depicts a graph 300 illustrating a comparison of using an uncoded scheme and a concatenated coding scheme based on codes listed in Table 2. Line 302 corresponds to a coding performance using an uncoded scheme, while lines 304-320 correspond to coding performances using the different concatenated coding schemes listed to the right of the graph. The x-axis represents an input signal signal-to-noise ratio (SNR), and the y-axis represents an output signal bit error rate (BER). For example, compared to the uncoded signal (i.e., FEC is not applied), using RS(248,216) as the outer FEC code reduces the SNR input signal requirement from approximately 15 dB to 7 dB to achieve an output BER of 1e−15 (one error per $10^{15}$ bits of data). If the concatenation code of RS(248,216) and Repetition (4,1) are used as the respective outer and inner codes, the SNR input signal requirement is further reduced to 3 dB to obtain the same output BER of 1e-15. Thus, simple inner code such as Repetition (4,1) may be used to improve BER performance, which may be converted to link budget gains.

It is apparent from Table 2 and FIG. 3 that various code rates and gains may be achieved by using different inner codes. For example, the concatenation of inner EHamming (8,4) code and outer RS(248,216) code provides an overall code rate of approximately 0.44 dB, while working at a BER input level of 1.6e-2 to achieve an output BER of 1e-15. As another example, the concatenation of inner SEBCH (13,8) code and outer RS(248,216) code provides an overall code rate of approximately 0.54 while achieving very similar performance gain with an input BER of 1.8e-2 and output BER 1e-15. In sum, different inner codes may be selected to improve BER performance and achieve different gains in link budget.

Figure 4A:
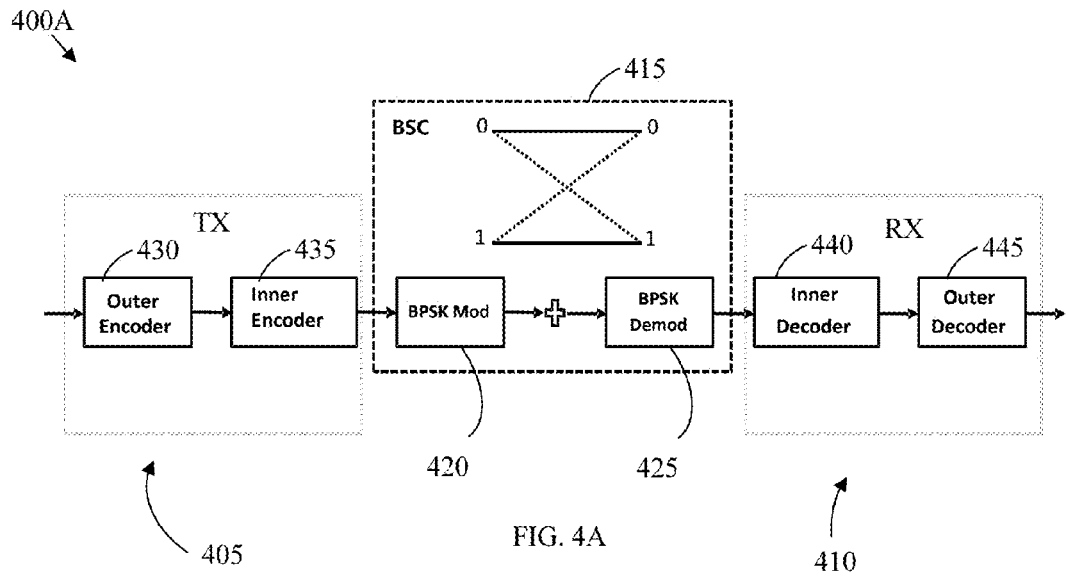
FIGS. 4A and 4B depict systems for correcting errors using a concatenated coding scheme according to an embodiment of the disclosure.
Figure 4B:
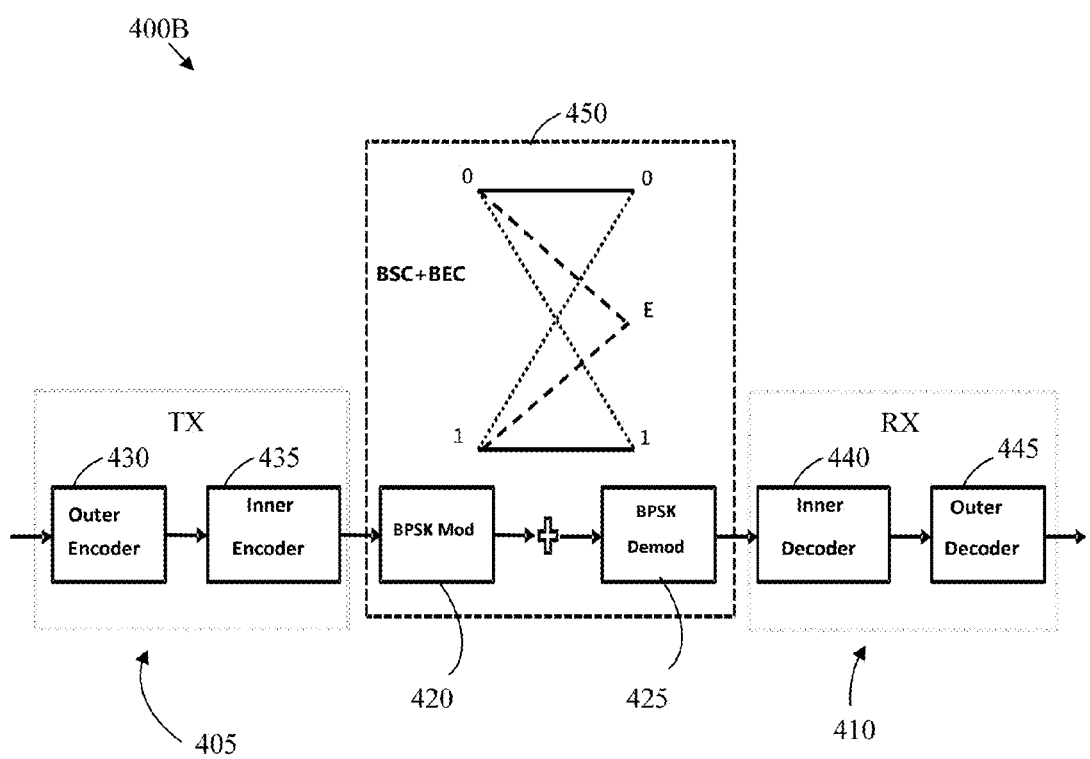

FIGS. 4A and 4B illustrate systems 400A, 400B for correcting errors using concatenation codes according to an embodiment of the disclosure. System 400A comprises a transmitter 405 (e.g., TX 210 or TX 255) communicatively coupled to a receiver 410 (e.g., RX 225 or RX 240) via a first transmission channel 415. The first transmission channel 415 may comprise an additive white Gaussian noise (AWGN) link modeled as a binary symmetric channel (BSC) due to a binary phase-shift keying (BPSK) modulator 420 and BPSK demodulator 425. The transmitter 405 may comprise an outer encoder 430 (e.g., encoder 215 or 260) coupled to an inner encoder 435 (e.g., encoder 220 or 265), while the receiver 410 may comprise an inner decoder 440 (e.g., decoder 230 or 245) coupled to an outer decoder 445 (e.g., decoder 235 or 250). In some aspects, the BPSK modulator 420 may be implemented within the transmitter 405 and the BPSK demodulator 425 may be implemented within the receiver 410.

System 400B is similar to system 400A, except the first transmission channel 415 may be mixed with a binary erasure channel (BEC) to provide a second transmission channel 450. In operation, the transmitter 405 may transmit data encoded by the outer encoder 430 and inner encoder 435 via the first or second transmission channel 415 or 450, where the transmitted data may undergo modulation and demodulation operations via the BPSK modulator 420 and BPSK demodulator 425, respectively. In system 400A, the transmitted data may comprise a binary symbol such as a "0" bit or "1" bit. However, there may be instances where an error results in a flipped bit, e.g., the transmitter 405 transmits a "0" but the receiver 410 receives a "1" (or vice versa).

Upon receiving a transmitted symbol such as a "0," the symbol may be decoded by the inner decoder 440 (e.g., using an error code used by the inner encoder 435). Based on the decoding results, the inner decoder 440 may output either a "0" or "1" to the outer decoder 445. The outputted bit may then be decoded by the outer decoder 445 (e.g., using an error code used by the outer encoder 435). In some cases, the inner decoder 440 may be unable to correctly decode a symbol received over the first transmission channel 415, or the inner decoder 440 may determine that the decoding result is too unreliable. In such cases, the inner decoder 440 may not output any information to the outer decoder 445. For example, the inner decoder 440 may implement a hard-decision decoding algorithm that outputs "hard" information indicating whether a given input corresponds to a fixed value such as a binary bit. Thus, if the inner decoder 440 cannot determine whether a given input corresponds to a certain value (e.g., one or zero) within a fixed set, the inner decoder 440 may simply ignore that input and not output any information to the outer decoder 445.

Like system 400A, data transmitted via the second transmission channel 450 may comprise a binary symbol such as a "0" bit or "1" bit. As discussed above, there may be instances where bits become flipped. However, there may also be instances where an error results in a bit becoming erased (e.g., an "Erasure" output bit), in which case the receiver 410 may receive a message indicating that the bit was not received or that the bit contains unknown information. In such cases, the inner decoder 440 may attempt to decode the unknown information, e.g., using an inner code listed in Table 2. Yet if the inner code is too simple, the inner decoder 440 may be unlikely to decode the unknown information. Typically, such unknown information may be ignored.

In an embodiment, the inner decoder 440 may pass unknown information to the outer decoder 445. For instance, the inner decoder 440 may implement a soft-decision decoding algorithm to output "soft" information or values other than a fixed set (e.g., one or zero), where the outputted values may indicate a level of reliability for each bit decoded by the inner decoder 440. Since the outer decoder 445 may employ a relatively stronger code (e.g., an RS code) than the inner decoder 440, the outer decoder 445 may use the soft input values from the inner decoder 440 to decode the unknown information with a greater degree of accuracy. While passing soft information from the inner decoder 440 to the outer decoder 445 may add some complexity to the decoding process, overall performance may substantially improve.

For example, assume the outer encoder 430 at the transmitter 405 utilizes RS(248,16) to encode data and the inner encoder 435 utilizes Repetition (4,1) to encode data obtained from the outer encoder 430. After the outer encoder 430 and inner encoder 435 encode their respective data, the transmitter 405 may transmit the encoded data via the second transmission channel 450, where the encoded data may by modulated and demodulated via the BPSK modulator 420 and BPSK demodulator 425, respectively.

Upon receiving the encoded data via the second transmission channel 450, the inner decoder 440 may perform a decoding operation using Repetition (4,1). Ideally, the data decoded by the inner decoder 440 will comprise quadruple patterns having at least three ones (e.g., 0111, 1011, 1101, 1110, or 1111) or three zeros (e.g., 0001, 0010, 0100, 1000, or 0000). However, when a given pattern contains a pair of ones or zeros (e.g., 0011, 1010, 0101, 1100, 1001, or 0110), the inner decoder 440 may mark the pattern as "unknown" and pass it to the outer decoder 445. The outer decoder 445 may then use RS(248, 16) to decode the unknown pattern such as by running a plurality of patterns into a decoding algorithm.

For instance, if the unknown information obtained from the inner decoder 440 indicate a pattern of "0011," the outer decoder 445 may run close matching patterns (e.g., 0001, 0111, or 0010) to identify a potential result based on a decoding criteria. As an example, if inputting "0001" and "0111" result in a first pattern and a second pattern, the outer decoder 445 may compare the two patterns with an entire stream of data. The outer decoder 445 may then select the pattern that best fits the stream of data, e.g., in terms of BER performance or some other criteria. By passing "unknown" information from the inner decoder 440 to the outer decoder 445 in system 400B, BER performance may be improved by about 0.8 dB as compared to system 400A.

In an embodiment, the selected inner and outer codes may have a granularity of 8 bits (i.e., one byte) or 32 bits (i.e., one word). More specifically, the inner codes and outer codes may be byte- or word-aligned with another, e.g., to ensure that the inner encoder 435 and inner decoder 440 encode and decode blocks of data in alignment with the encoding and decoding of the outer encoder 430 and outer decoder 445. For example, if the inner decoder 440 uses an inner code that generates an output comprising 8 bits, the outer decoder 445 should use an outer code that operates on 8-bit blocks of data. This may be useful in implementing embodiments of the disclosure with a PON system, as most PON frame structures and protocol designs follow the byte- or word-alignment principle. This may also limit any uncertainty within a byte or word boundary, while preventing errors from propagating outside.

Figure 5:
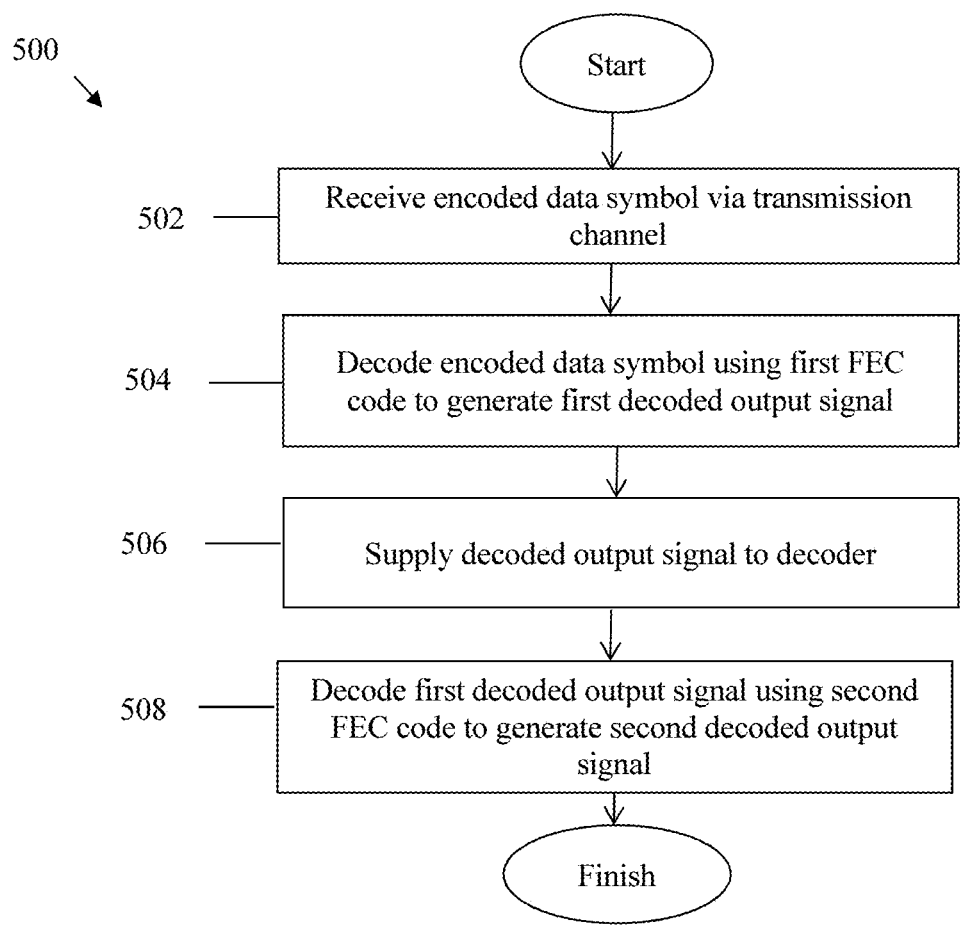
FIG. 5 depicts a flowchart of a method for decoding data according to an embodiment of the disclosure.

FIG. 5 depicts a method 500 of decoding data according to an embodiment of the disclosure. The operations may be performed in the order shown, or in a different order. Further, two or more of the operations may be performed concurrently instead of sequentially. The method commences at block 502, where an encoded data symbol is received over a transmission channel (e.g., channel 450). The encoded data symbol may be transmitted from an OLT 110 to an ONU 120 in a downlink transmission, or from the ONU 120 to the OLT 110 in an uplink transmission. At block 504, the method 500 performs a first decoding operation (e.g., via inner decoder 440) using a first FEC code (e.g., such as listed in Table 2), which may be the same code used by an encoder (e.g., inner encoder 435) to encode the data symbol prior to transmission. At block 506, the method 500 supplies a first decoded output signal resulting from the first decoding operation to a decoder (e.g., outer decoder 445).

As previously discussed, the first decoded output signal may comprise soft information indicating that the encoded data symbol comprises a possible value (e.g., zero or one), or that the encoded data comprises unknown information (i.e., typically ignored). Thus, the first decoded output signal may serve as a soft input used by the decoder to perform a second decoding operation, which may include decoding any unknown information passed from another decoder (e.g., inner decoder 440) that generated the first decoded output signal. At block 508, the decoder may generate a second decoded output signal by performing the second decoding operation using a relatively stronger FEC code (e.g., an RS code) than the first FEC code, where the second FEC code may be the same code used by an encoder (e.g., outer encoder 430) to encode the data symbol prior to transmission.

Figure 6:
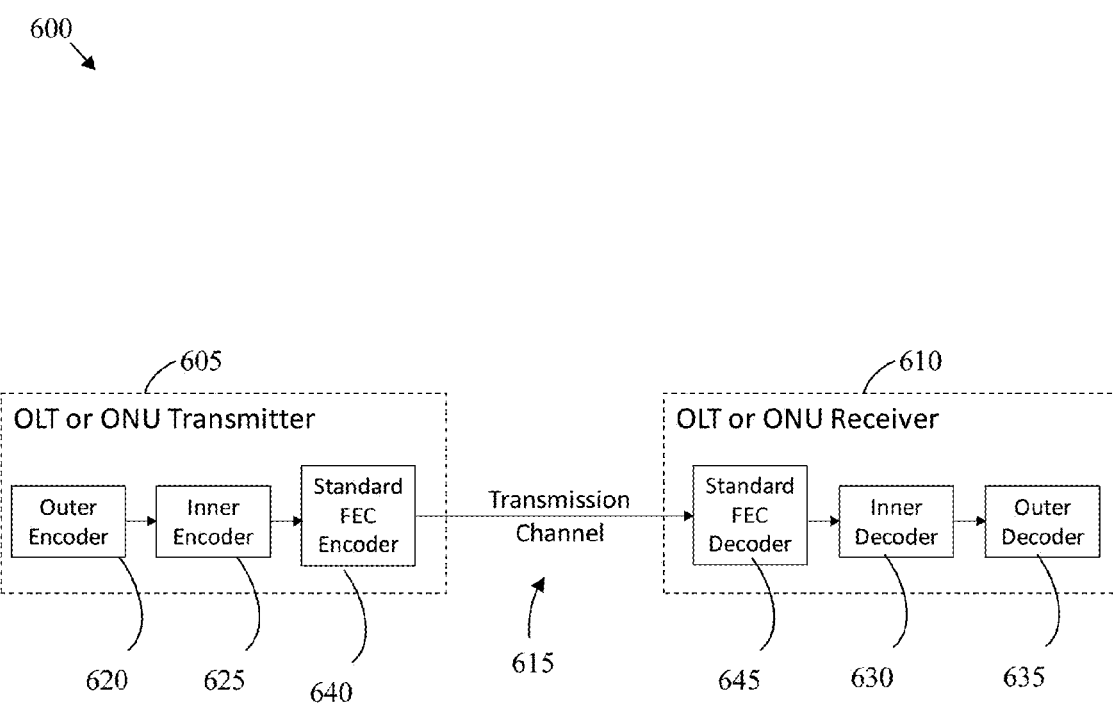
FIG. 6 depicts a schematic diagram of an FEC code concatenation system according to an embodiment of the disclosure.

FIG. 6 depicts a schematic diagram of an FEC code concatenation system 600 according to an embodiment of the disclosure. The system 600 comprises at least one transmitter 605 (e.g., TX 210, 255, or 405) coupled to at least one receiver 610 (e.g., RX 225, 240, or 410) via a transmission channel 615 (e.g., channel 205, 415, or 450). The transmitter 605 may comprise an OLT (e.g., OLT 110) configured to transmit data to the receiver 610, in which case the receiver 610 would comprise an ONU (e.g., ONU 120). Alternatively, the transmitter 605 may comprise the ONU, in which case the receiver 610 would comprise the OLT.

The transmitter 605 may comprise an outer encoder 620 and an inner encoder 625 corresponding to one of the previously discussed outer encoders (e.g., encoder 215, 260, or 430) and inner encoders (e.g., encoder 220, 265, or 435). Similarly, the receiver 610 may comprise an inner decoder 630 and an outer decoder 635 corresponding to one of the previously discussed inner decoders (e.g., decoder 230, 245, or 440) and outer decoders (e.g., decoder 235, 250, or 445). In an embodiment, the transmitter 605 may comprise a standard FEC encoder 640 coupled to the inner encoder 625, and the receiver 610 may comprise a standard FEC decoder 645 coupled to the inner decoder 630. More specifically, FIG. 6 discloses an embodiment in which adaptive FEC coding systems disclosed herein (e.g., systems 100, 200, 400A, 400B) may coexist with a PON system where ONUs may only implement standard FEC coding schemes.

In operation, when an OLT interacts with an ONU that implements a standard FEC coding scheme, the standard FEC encoder 640 and decoder 645 are used to transmit and receive data as usual. That is, the outer/inner encoders 620, 625 and inner/outer decoders 630, 635 are not applied to these data transmissions. In contrast, when an OLT interacts with an ONU implementing an adaptive FEC coding scheme according to the present disclosure, the outer/inner encoders 620, 625 and inner/outer decoders 630, 635 are used to encode and decode data as discussed above, while any parity bits added by the standard FEC encoder 640 and decoder 645 are ignored.

For example, in an XG-PON1 downstream transmission, the standard FEC decoder 645 may use a standard FEC code such as RS(248,216) to generate a data codeword of 216 bytes and 32 parity bytes. Assuming a concatenation code of RS(248,216) and Repetition (4,1) is employed in this example, a regular XG-PON1 ONU comprising a standard FEC decoder 645 may only decode received data using RS(248, 216) as the standard FEC code. By comparison, a new ONU (e.g., supports adaptive FEC coding) may first skip the 32 bytes added by the standard FEC decoder 645 in every 248 bytes, and then decode the data using Repetition (4,1) at the inner decoder 630 and using RS(248,216) at the outer decoder 635. This approach may allow standard ONUs and new ONUs to coexistence in the same PON system without adding significant overhead.

Figure 7:
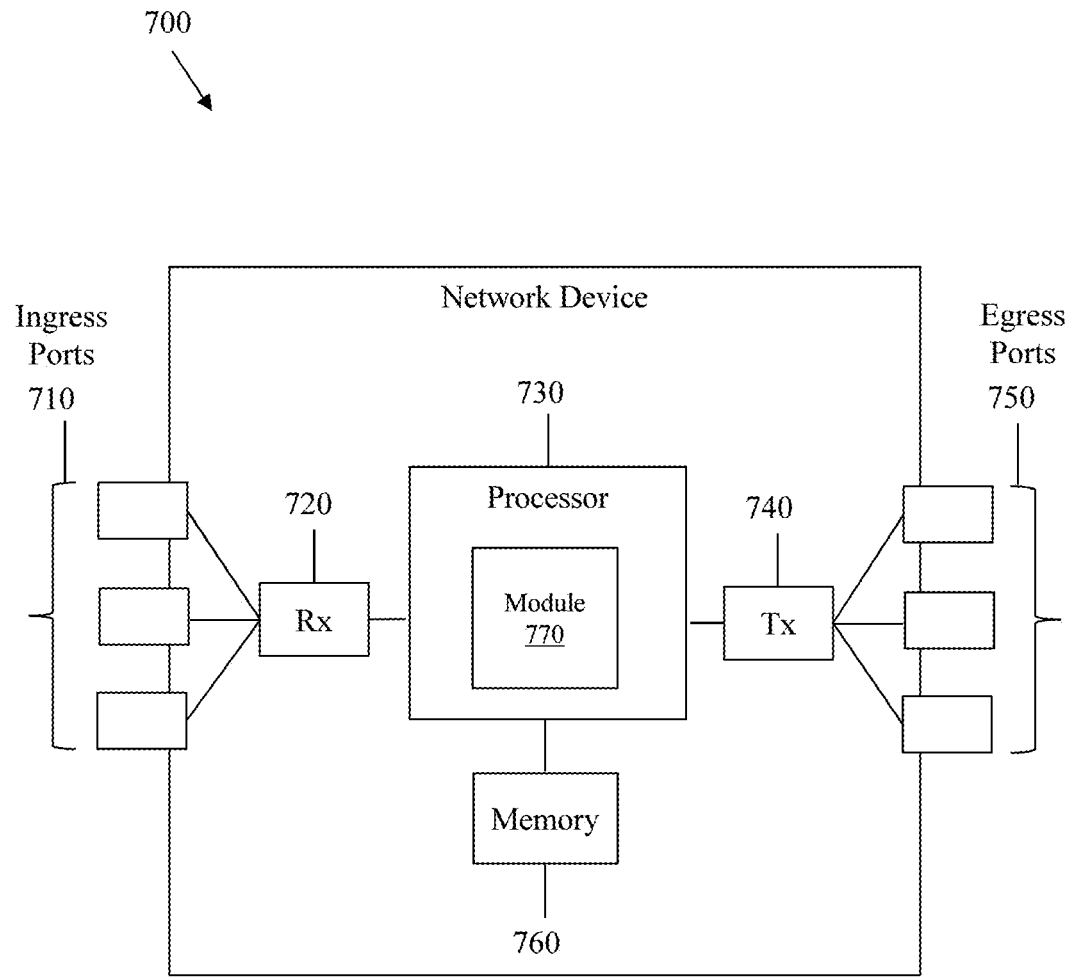
FIG. 7 depicts a schematic diagram of a network unit according to an embodiment of the disclosure.

FIG. 7 depicts a schematic diagram of a network device 700 according to an embodiment of the disclosure. The device 700 is suitable for implementing the disclosed embodiments as described herein. For example, the device 700 may be implemented in the OLT 110, the ONU 120, and/or any other component. The device 700 comprises ingress ports 710 and receiver units (Rx) 720 for receiving data; a processor, microprocessor, logic unit, or central processing unit (CPU) 730 to process the data; transmitter units (Tx) 740 and egress ports 750 for transmitting the data; and a memory 760 for storing the data. The device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 may be implemented by hardware and/or software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 may be communicatively linked to the ingress ports 710, receiver units 720, transmitter units 740, egress ports 750, and/or memory 760. The processor 730 comprises a module 770 configured to implement the embodiments disclosed herein, including method 500. The inclusion of the module 770 may therefore provide a substantial improvement to the functionality of the device 700 and effects a transformation of the device 700 to a different state. Alternatively, the module 770 may be implemented as readable instructions stored in the memory 760 and executable by the processor 730. The device 700 may include any other means for implementing the embodiments disclosed herein, including method 500.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (ROM), random-access memory (RAM), ternary content-addressable memory (TCAM), and static random-access memory (SRAM).

In an embodiment, the disclosure includes a network apparatus having means for receiving an encoded data signal. The network apparatus includes means for decoding the encoded data signal using a first code to generate a decoded signal, and means such when the encoded data signal comprises unknown information that was not successfully decoded by the first decoder and would otherwise be ignored, the decoded signal includes the unknown information. The network apparatus further includes means for decoding the decoded signal using a second code.

In an embodiment, the disclosure includes means for implementing a method at a receiver of a network unit. The receiver includes means for receiving an encoded data signal, and means for decoding the encoded data signal using a first code to generate a decoded signal, and means such that when the encoded data signal comprises unknown information that was not successfully decoded using the first code and would otherwise be ignored, the decoded signal includes the unknown information. The receiver further includes means for decoding the decoded signal using a second code.

In an embodiment, the disclosure includes means for executing instructions on a non-transitory computer readable medium, the instructions executable by a processor of a network unit to implement a method. The network unit includes means for receiving an encoded data signal, means for decoding the encoded data signal using a first code to generate a decoded signal, and means such that when the encoded data signal comprises unknown information that was not successfully decoded using the first and would otherwise be ignored, the decoded signal includes the unknown information. The network unit further includes means for decoding the decoded signal using a second code.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network apparatus comprising:
a receiver configured to receive an encoded data signal;
a first decoder coupled to the receiver, the first decoder configured to decode the encoded data signal using a first code selected from a plurality of different codes to generate a preliminary decoded signal including information not capable of being decoded by the first decoder; and
a second decoder coupled to the first decoder, the second decoder using a reusable second code configured to decode the information not capable of being decoded by the first decoder in the preliminary decoded signal, the first code and the second code being configured to collectively indicate a budget for an optical link.

2. The network apparatus of claim 1, wherein the second code comprises a Reed-Solomon (RS) code, and the plurality of different codes comprise at least one of the following codes: Repetition code, extended Hamming code, shortened-extended Bose-Chaudhuri-Hocquenghem (BCH) code, or shortened Extended-BCH (SEBCH) code.

3. The network apparatus of claim 1, wherein the first code and the second code are byte- or word-aligned with one another.

4. The network apparatus of claim 1, wherein the network apparatus further comprises a standard forward error correction (FEC) decoder having an output coupled to an input of the first decoder.

5. The network apparatus of claim 1, wherein the network apparatus comprises an optical network unit (ONU) or an optical line terminal (OLT).

6. The network apparatus of claim 1, wherein the encoded data signal is received via a transmission channel configured as a binary symmetric channel (BSC) mixed with a binary erasure channel (BEC).

7. A method implemented at a receiver of a network unit, the method comprising:
receiving an encoded data signal;
decoding the encoded data signal using a first code selected from a plurality of different codes to generate a preliminary decoded signal including information not capable of being decoded using the first code; and
decoding the information not capable of being decoded using the first code in the preliminary decoded signal using a reusable second code,
the first and second code being configured to collectively indicate a budget for an optical link.

8. The method of claim 7, wherein the second code comprises a Reed-Solomon (RS) code, and the plurality of different codes comprise at least one of the following codes: Repetition code, extended Hamming code, shortened-extended Bose-Chaudhuri-Hocquenghem (BCH) code, or shortened Extended-BCH (SEBCH) code.

9. The method of claim 7, wherein the first code and the second code are byte- or word-aligned with one another.

10. The method of claim 7, wherein the network unit comprises an optical network unit (ONU) or an optical line terminal (OLT).

11. The method of claim 7, wherein the receiver comprises:
a first decoder configured to decode the encoded data signal; and
a standard forward error correction (FEC) decoder having an output coupled to an input of the first decoder.

12. The method of claim 7, wherein the encoded data signal is received via a transmission channel configured as a binary symmetric channel (BSC) mixed with a binary erasure channel (BEC).

13. A non-transitory computer readable medium comprising instructions executable by a processor of a network unit to implement a method, the method comprising:
receiving an encoded data signal;
decoding the encoded data signal using a first code selected from a plurality of different codes to generate a preliminary decoded signal including information not capable of being decoded using the first code; and
decoding the information not capable of being decoded using the first code in the preliminary decoded signal using a reusable second code,
the first code and the second code being configured to collectively indicate a budget for an optical link.

14. The non-transitory computer readable medium of claim 13, wherein the second code comprises a Reed-Solomon (RS) code, and the plurality of different codes comprise at least one of the following codes: Repetition code, extended Hamming code, shortened-extended Bose-Chaudhuri-Hocquenghem (BCH) code, or shortened Extended-BCH (SEBCH) code.

15. The non-transitory computer readable medium of claim 13, wherein the first code and the second code are byte- or word-aligned with one another.

16. The non-transitory computer readable medium of claim 13, wherein the processor is configured to implement the method in a passive optical network (PON), and wherein the network unit comprises an optical network unit (ONU) or an optical line terminal (OLT).

17. The non-transitory computer readable medium of claim 13, wherein the encoded data signal is received via a transmission channel configured as a binary symmetric channel (BSC) mixed with a binary erasure channel (BEC).

* * * * *